United States Patent [19]

Ahonen et al.

[11] Patent Number: 4,865,783

[45] Date of Patent: Sep. 12, 1989

[54] METHOD OF MANUFACTURING A REUSABLE MOLD

[75] Inventors: Heikki Ahonen, Valkeakoski; Reijo Hakulinen; Eero Lahti, both of Tampere, all of Finland

[73] Assignee: Oy Partek Ab, Parainen, Finland

[21] Appl. No.: 828,892

[22] Filed: Feb. 13, 1986

[30] Foreign Application Priority Data

Feb. 13, 1985 [FI] Finland .................................. 850605

[51] Int. Cl.[4] ........................ B29B 17/00; B29C 33/52

[52] U.S. Cl. ...................................... 264/37; 264/40.1; 264/138; 264/139; 264/221; 264/225; 264/317; 264/DIG. 44; 264/DIG. 69; 425/142; 425/175; 425/DIG. 12; 425/DIG. 46

[58] Field of Search ......... 264/37, 221, 317, DIG. 44, 264/138, 139, 225, 40.1, DIG. 69; 425/175, DIG. 12, DIG. 46, 142

[56] References Cited

U.S. PATENT DOCUMENTS

| | | | |
|---|---|---|---|
| 3,422,168 | 1/1969 | Bowser | 264/37 X |
| 3,423,488 | 1/1969 | Bowser | 264/37 X |
| 3,683,486 | 8/1972 | Rope et al. | 264/225 X |
| 3,748,202 | 7/1973 | Iisaka et al. | 264/225 X |
| 4,001,062 | 1/1977 | Iisaka et al. | 264/225 X |

OTHER PUBLICATIONS

*The Condensed Chemical Dictionary*, Tenth Edition, Revised by Gessner G. Hawley, New York, van Nostrand Reinhold, ©1981, pp. 199 and 1094.

*Hackh's Chemical Dictionary*, Fourth Edition, Completely Revised and Edited by Julius Grant, New York, McGraw-Hill, ©1972, p. 660.

*Primary Examiner*—Philip Anderson

*Attorney, Agent, or Firm*—Birch, Stewart, Kolasch & Birch

[57] ABSTRACT

A method for the manufacture of a mold out of mold material from a previous blank by machining each blank into a desired shape by means of a machine tool controlled by a computer utilizing a dimensioning data set. Each blank is manufactured by feeding an organic polymer material whose melting point is preferably lower than 150° C. in liquid form into a box-shaped container which is open at the top and which corresponds to the dimensions of the desired mold. Waste polymer material from the blank upon machining is recovered and heated to a temperature higher than its melting point, whereupon it is fed onto an existing mold no longer needed, so as to provide a new blank for a new mold.

8 Claims, 1 Drawing Sheet

METHOD OF MANUFACTURING A REUSABLE MOLD

The present invention concerns a method for the manufacture of molds, and in particular of molds of irregular shapes.

The method concerns in particular the manufacture of molds for concrete panels, but the method may be applied to the mold technology for any material to be cast whatsoever or to the manufacture of such a mold in which the casting temperature remains within certain limits.

The mold technique is commonly based on that a material structure is shaped around the desired formed piece, which said formed piece is detachable from the said material structure, whereby the ultimate piece can be cast by means of a known method in the cavity produced. The casting is carried out typically under conditions in which the ultimate material is, in one form or other, fluid, compressible, extrusible, or molten.

Under these circumstances, molds have been commonly constructed of a readily deformable material, which can be kept solid at some stage and which endures the casting conditions. The solidification can be performed, e.g., by means of polymers. This is done when metal-casting molds are manufactured out of sand and polymers acting as binders. By means of various hydratation reactions, solidification can be made to take place by the effect of hardening of gypsum.

On the other hand, molds can be manufactured out of solid materials into desired shape, in which case the material to be cast must have a suitable consistency.

This is a typical procedure in present-day concrete casting technique, wherein the mold material used is either metal, wood, plastic, or equivalent. A fluid or rather stiff concrete mix is cast into the mold. This mix must be such that it can be packed in one way or another so that it fills all the spaces in the mold completely.

The concrete casting technique described above is problematic in that the materials used to define the construction of the mold utilize excessively planar faces, which consist of metal sheets, slabs, mold plywood, boards, or different plastic boards and plastic components. Creation of free forms requires difficult and costly work. Moreover, the manufacture of a mold of the sort described above requires an abundance of manual work and storage area, and is therefore costly.

In most cases, such molds, even though they are not completely disposable, offer a series of 10 to 50 pieces for concrete panels. The cost of a mold is, however, so high that the mold is in many cases stored for a certain period of time in case a corresponding series is repeated.

From the above, a mold of this type requires an abundance of manual work and are made of very expensive materials. Moreover, the mold is always considerably more expensive than the product manufactured by the mold, and the cost of the mold with respect to the price of the product starts losing its signficance only when the lengths of the series of panels are several tens of pieces.

In view of automation of the industry of prefabrication of concrete panels or, in general, of the industry making use of casting technique, the concrete panel technique described above does not offer any simple possibilities for automatic manufacture of molds.

SUMMARY OF THE INVENTION

The object of the present invention is to eliminate the drawbacks present in the prior-art technology described above and to provide a method of an entirely novel type of mold manufacture.

It has been possible to achieve this object by means of the method in accordance with the invention, which is based on:

- each mold blank is manufactured by feeding an organic polymer material in fluid form into an, e.g., box-shaped container which is open at the top and which corresponds to the dimensions of the desired mold,
- the polymer material being detached from the blank upon machining is recovered, and
- this recovered material is heated to a temperature higher than its melting point and fed onto such a mold as is no longer needed, so as to provide a blank for a new mold.

By means of the invention, it has been possible to combine automatic manufacture of molds and the use of completely free shapes in a way that has not been applied in the prior art.

Further scope of applicability of the present invention wil become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
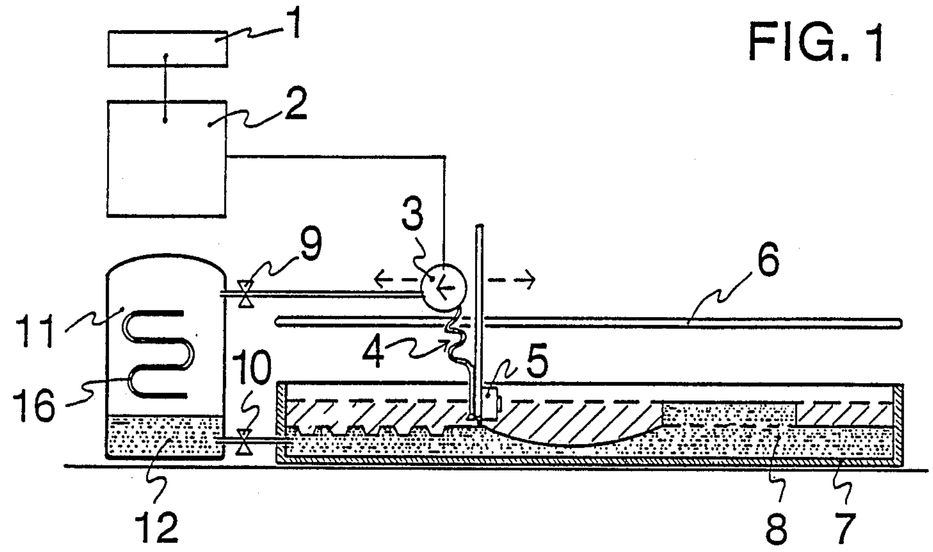
FIG. 1 is a partly schematic view of one embodiment of the method of the present invention during creation of the free shapes in the mold.
Figure 2:
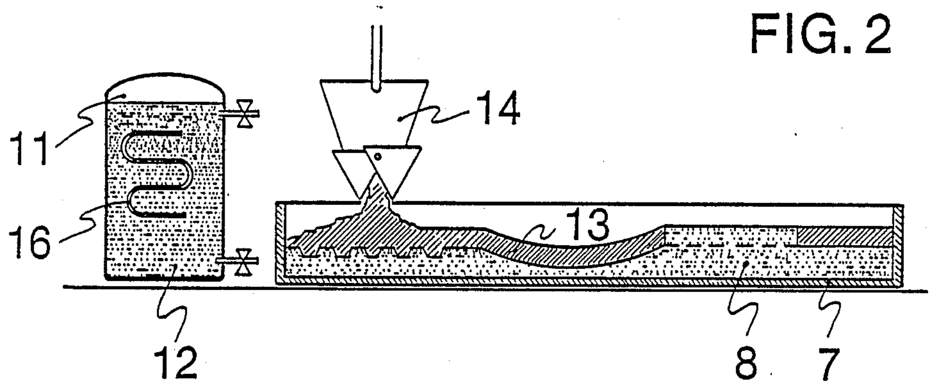
FIG. 2 is a partly schematic view of the method of the present invention as concrete is cast from a feeder.

The method of the present invention starts with the free shapes of the mold being created by means of a numerically controlled machine tool 3 to 5, moving along a rail 6, which shapes the mold out of a blank of suitable material 8. The machine tool 3 to 5 receives numerical instructions from a computer 2 that reads a drawing, and the machine tool copies the design shown by the drawing on the desired scale three-dimensionally in the mold material 8 so that the details and limitations indicated by the drawing are taken into account. The numerically controlled machine tool 3 to 5, which shapes the mold material 8, receives the drawing data directly from a magnetic or other data set 1 either without an optical reading device or by the intermediate of an optical reading device. Then, into the ready-processed mold 8, the concrete 13 is cast from a feeder 14 in a way known per se.

The mold materials 8 advantageously suitable for this technique are, according to the invention, materials that can be used again and again for the formation of new mold blanks. Such materials are, e.g., such organic polymers whose molecular weight is so low that they have an adequate fluidity at reasonable temperatures. Thereby they can be cast into a desired space 7 as a preliminary blank, out of which the ultimate mold can be prepared.

Figure 3:
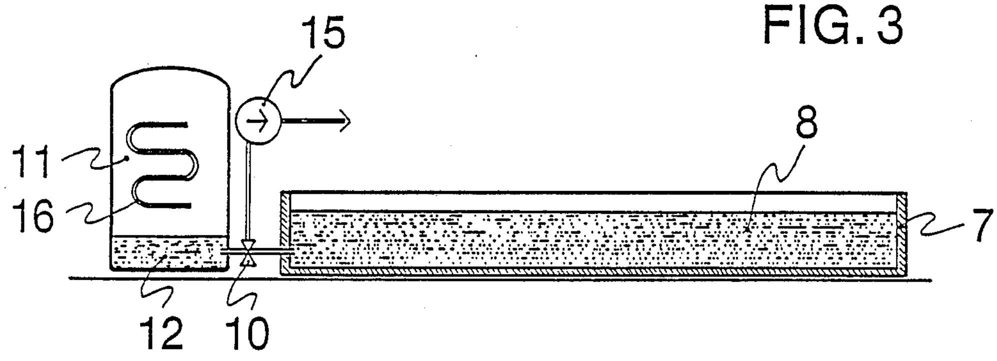
FIG. 3 is a partly schematic view of the method of the present invention before renewed form-milling.

The manufacture of a mold out of organic polymer materials of the said sort, which melt at a temperature preferably below 150° C., takes place as follows:

Into a space 7 limited from five sides, into which the mould blank is supposed to be shaped, the polymer material 8 is cast as molten while filling the whole space 7. After this material 8 has solidified, the desired shape is milled into it by using either heating or mechanical milling or both of them at the same time. The detached material 12 to be removed by milling is collected into a container 11 and, after melting performed by means of a heating spiral 16, returned through a valve 10 and a pump 15 onto another mould structure, which has already been discarded or used. Thereby it refills the cavities provided in the earlier mould and permits renewed form-milling (FIG. 3).

Typically advantageous polymer materials which meet the requirements of the said mould technique are, for example, paraffin, polymer waxes, such as polyethylene wax, whose molecular weight is 1500 to 3300, as well as various products of polymerization of tall oil.

What is claimed is:

1. A method of manufacturing reusable molds from mold blanks made of an organic polymer material having a given melting point, said method comprises the steps of:

holding a first mold made from said organic polymer material in a container having dimensions of a desired mold;

heating an additional amount of said organic polymer material to a temperature higher than said melting point to bring said additional amount to a liquid state;

pouring said additional amount of said organic polymer material in the liquid state onto said first mold in said container;

cooling said additional amount of said organic polymer material to a temperature under said melting point to form, in combination with said first mold, an integral mold blank;

maching said integral mold bank into a second mold of a desired shaped; and recovering machined-out organic polymer material from the machined, second mold, said recovered organic polymer material being used as the additional amount when the steps are repeated whereby said organic polymer material is recycled.

2. The method according to claim 1, wherein said machining is done by milling.

3. The method according to claim 1, wherein said machining is performed by a machine tool controlled by a computer.

4. The method according to claim 1, wherein said machining is performed by hot-shearing.

5. The method according to claim 1, wherein said container is box-shaped and disposed horizontally.

6. The method according to claim 1, further comprising the steps of:

heating said machined-out organic polymer material to a temperature higher than said melting point during said recovering to bring said machined-out organic polymer material to a liquid state; and holding the machined-out material in liquid state in a supply container for later covering said second mold.

7. The method according to claim 1, wherein said organic polymer material is selected from the group of polyethylene wax, paraffin, and polymerized tall oil.

8. The method according to claim 1, wherein said organic polymer material has a melting point lower than 150° C.

* * * * *